US009647562B2

(12) United States Patent
Hinz et al.

(10) Patent No.: US 9,647,562 B2
(45) Date of Patent: May 9, 2017

(54) POWER CONVERSION WITH SWITCH TURN-OFF DELAY TIME COMPENSATION

(71) Applicant: Infineon Technologies Austria AG, Villach (AT)

(72) Inventors: Torsten Hinz, Augsburg (DE); Marc Fahlenkamp, Geretsried (DE); Martin Krueger, Oberschleissheim (DE); Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 46 days.

(21) Appl. No.: 14/607,488

(22) Filed: Jan. 28, 2015

(65) Prior Publication Data
US 2015/0244275 A1    Aug. 27, 2015

Related U.S. Application Data

(60) Provisional application No. 61/944,869, filed on Feb. 26, 2014.

(51) Int. Cl.
| | | |
|---|---|---|
| *H02M 3/335* | (2006.01) | |
| *H02M 1/08* | (2006.01) | |
| *H02M 1/00* | (2006.01) | |

(52) U.S. Cl.
CPC ......... *H02M 3/33507* (2013.01); *H02M 1/08* (2013.01); *H02M 2001/0048* (2013.01); *Y02B 70/1491* (2013.01)

(58) Field of Classification Search
CPC ............... H02M 3/33507; H02M 1/08; H02M 2001/0048; H02M 7/53873; H02M 3/157; H02M 3/158; Y02B 70/1491

USPC .. 363/21.01, 21.12, 21.13, 21.15, 21.18, 97; 323/282, 283, 284, 271, 312
See application file for complete search history.

(56) References Cited

U.S. PATENT DOCUMENTS

| | | | |
|---|---|---|---|
| 6,714,424 B2 | 3/2004 | Deng et al. | |
| 2005/0285582 A1* | 12/2005 | Azuma | H02M 7/53873 323/282 |
| 2006/0013020 A1* | 1/2006 | Aso | H02M 3/33507 363/21.01 |

(Continued)

FOREIGN PATENT DOCUMENTS

| | | |
|---|---|---|
| CN | 1714495 A | 12/2005 |
| CN | 1938932A A | 3/2007 |

(Continued)

*Primary Examiner* — Gary L Laxton
*Assistant Examiner* — Jye-June Lee
(74) *Attorney, Agent, or Firm* — Slater Matsil, LLP (57) ABSTRACT

In accordance with an embodiment, a method includes driving an electronic switch in a switched-mode power converter in successive drive cycles, wherein driving the switch in each of the drive cycles comprises switching on the electronic for an on-period and subsequently switching off the electronic switch for an off-period. The method further includes establishing the on-period based on a comparison of an on-time signal with an off-threshold, calculating the off-threshold based on an output signal of the switched-mode power converter and a compensation offset, and calculating the compensation offset in one drive cycle based on an estimated delay time, wherein the estimated delay time is calculated based on a measured delay time and an estimated delay time of a previous drive cycle.

26 Claims, 8 Drawing Sheets

(56) References Cited

U.S. PATENT DOCUMENTS

| | | | |
|---|---|---|---|
| 2011/0068965 A1* | 3/2011 | Sasaki | H02M 3/157 323/312 |
| 2014/0252981 A1* | 9/2014 | Xie | H02M 3/33507 363/21.12 |
| 2015/0349636 A1* | 12/2015 | Bodano | H02M 3/158 323/271 |

FOREIGN PATENT DOCUMENTS

| | | |
|---|---|---|
| CN | 101588128 A | 11/2009 |
| CN | 102651611 A | 8/2012 |
| CN | 203206101 U | 9/2013 |
| WO | 2012167161 A1 | 12/2012 |

\* cited by examiner

POWER CONVERSION WITH SWITCH TURN-OFF DELAY TIME COMPENSATION

This application claims the benefit of U.S. Provisional Application No. 61/944,869, filed on Feb. 26, 2014, which application is hereby incorporated herein by reference in its entirety.

TECHNICAL FIELD

This disclosure in general relates to power conversion and more particularly to power conversion with delay compensation.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

SUMMARY

One embodiment relates to a method. The method includes driving an electronic switch in a switched-mode power converter in successive drive cycles, wherein driving the switch in each of the drive cycles comprises switching on the electronic for an on-period and subsequently switching off the electronic switch for an off-period. The method further includes establishing the on-period based on a comparison of an on-time signal with an off-threshold, calculating the off-threshold based on an output signal of the switched-mode power converter and a compensation offset, and calculating the compensation offset in one drive cycle based on an estimated delay time, wherein the estimated delay time is calculated based on a measured delay time and an estimated delay time of a previous drive cycle.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
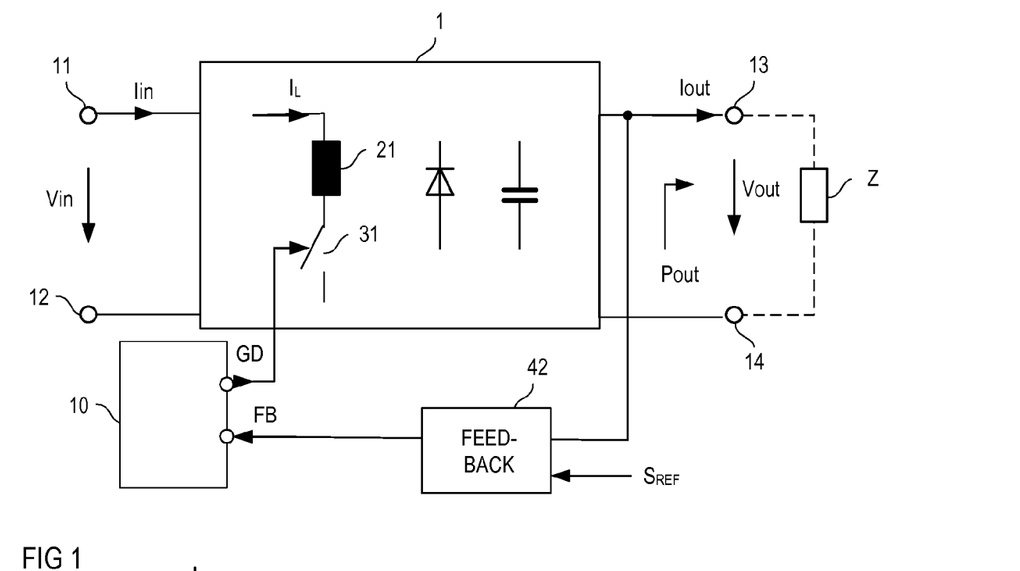
FIG. 1 illustrates one embodiment of a switched-mode power converter.

FIG. 1 shows one embodiment of a switched-mode power converter. The switched-mode power converter shown in FIG. 1 includes an input 11, 12 for receiving an input voltage Vin and an input current Iin, and an output 13, 14 for supplying an output voltage Vout and an output current Iout to a load Z (illustrated in dashed lines in FIG. 1) that may be connected to the output 13, 14. The input may include a first input node 11 and a second input node 12, and the output may include a first output node 13 and a second output node 14. According to one embodiment, the switched-mode power converter is configured to generate an output signal such that the output signal has a substantially constant signal level which is widely independent of a power consumption of the load Z. The "output signal" may be the output voltage Vout, the output current Iout, or the output power Pout. That is, the switched-mode power converter may be configured to regulate the output voltage Vout or the output current Iout. In the following, the output signal will be referred to as S out.

The switched-mode power converter is configured to regulate the output signal by suitably driving an electronic switch 31 that is connected in series with an inductor 21. The inductor 21 is part of a network 1 that, besides the inductor 21 and the electronic switch 31, may include a rectifier circuit with at least one rectifier element and a capacitor. This network may include a flyback converter topology, a buck converter topology, a boost converter topology, or the like. Some illustrative embodiments of the network 1 are explained with reference to drawings below.

Referring to FIG. 1, the switched-mode power converter includes a controller (which may also be referred to as drive circuit) which is configured to drive the electronic switch 31. Specifically, the controller 10 generates a drive signal GD which is received at a control node of the electronic switch 31 and switches the electronic switch 31 on or off. The controller may be configured to drive the electronic switch 31 in a PWM (Pulse-Width Modulated) fashion. In this case, the drive signal GD is a PWM signal.

The controller 10 is configured to drive the electronic switch 31 based on the output signal Sout (e. g., the output voltage Vout or the output current Iout). For this, the controller 10 receives a feedback signal FB which is based on the output signal from a feedback circuit 42. The feedback circuit 42 may include a regulator that receives the output signal Sout and that either receives a reference voltage $S_{REF}$ (as shown) or internally generates the reference signal $S_{REF}$. The regulator compares the output signal with the reference signal $S_{REF}$ and generates the feedback signal FB based on this comparison. The reference signal $S_{REF}$ represents the desired signal level (the set value) of the output signal Sout. The regulator 421 may have one of a proportional (P) characteristic, a proportional-integral (PI) characteristic, or the like.

The feedback circuit 42 may further include a transmitter circuit that is suitable to transmit the feedback signal FB across a potential barrier. Such transmitter circuit may be used when the network 1 includes a potential barrier that galvanically isolates the input 11, 12 and the output 13, 14 of the switched-mode power converter. The transmitter circuit may include an optocoupler, or any other type of circuitry that is suitable to transmit a signal across a potential barrier. According to another embodiment, the transmitter includes a transformer.

Figure 2:
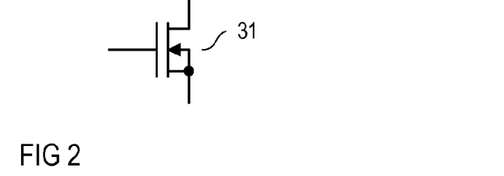
FIG. 2 shows one embodiment of the electronic switch in the switched-mode power converter.

The electronic switch 31 can be a conventional electronic switch. According to one embodiment shown in FIG. 2, the electronic switch 31 is a MOSFET (Metal-Oxide Field-Effect Transistor). This MOSFET includes a load path between a drain node and a source node, and a gate node as a control node. When a MOSFET as shown in FIG. 2 is used as the electronic switch 31 in the switched-mode power converter shown in FIG. 1, the gate node receives the drive signal GD and the load path (drain-source path) is connected in series with the inductor 21. However, the electronic switch 31 is not restricted to be implemented as a MOSFET. Another type of transistor, such as an IGBT (Insulated Gate Bipolar Transistor), a BJT (Bipolar Junction Transistor), a JFET (Junction Field-Effect Transistor) or even combinations of several transistors, such as a cascade circuit with a JFET and a MOSFET, may be used as well.

Figure 3:
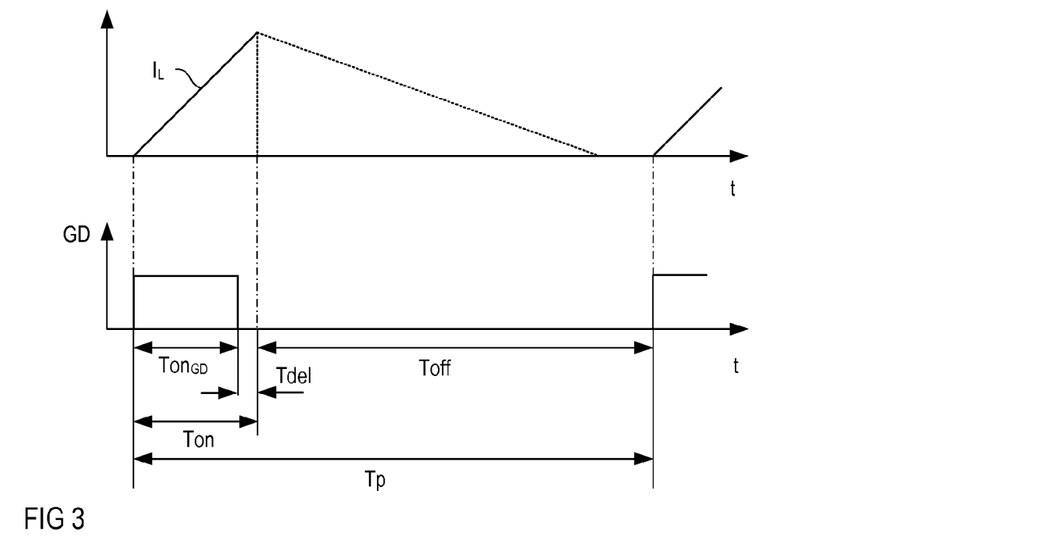
FIG. 3 shows timing diagrams that illustrate one way of operation of the switched-mode power converter.

One way of operation of the switched-mode power converter is explained with reference to FIG. 3. FIG. 3 shows, during one drive cycle of the switched-mode power converter, timing diagrams of the drive signal GD and an inductor current $I_L$. The inductor current $I_L$ is a current through the inductor 21. According to one embodiment, the inductor current $I_L$ corresponds to the input current Iin.

The controller 10 is configured to drive the electronic switch 31 in successive drive cycles. Referring to FIG. 3, each drive cycle includes an on-period in which the electronic switch 31 is switched on (is in an on-state), and a subsequent off-period in which the electronic switch 31 is switched off (is in an off-state). An overall duration Tp of one drive cycle is given by a duration Ton of the on-period plus a duration Toff of the off-period. The duration Ton of the on-period will be referred to as on-time in the following, and the duration Toff of the off-period will be referred to as off-time in the following. The overall duration Tp is dependent on a switching frequency $f_{SW}$ which is the frequency at which the drive signal GD switches the electronic switch on and off, with $Tp=1/f_{SW}$. According to one embodiment, the switching frequency is between 20 kHz and 100 kHz. In this case, the duration Tp of one drive cycle ranges from 10 microseconds (μs) (=1/100 kHz) to 50 microseconds (=1/20 kHz).

Referring to FIG. 3, the inductor current $I_L$ increases during the on-time Ton and decreases during the off-time Toff. The slope of the increase may be dependent on the input voltage Vin. This is explained with reference to embodiments herein further below.

The on-time Ton and the off-time Toff of the electronic switch 31 are governed by the drive signal GD. In order to switch on the electronic switch 31 the drive signal GD assumes an on-level, and in order to switch off the electronic switch 31 the drive signal GD assumes an on-level. Just for the purpose of illustration it is assumed that the on-level corresponds to high signal level and the off-level corresponds to a low signal level of the drive signal. In FIG. 3, $Ton_{GD}$ denotes a time period when the drive signal GD has an on-level. A signal pulse of the drive signal GD which has the on-level will be referred to as on-pulse in the following. Due to inevitable delays in the controller 10 and the electronic switch 31 the electronic switch 31 does not switch off immediately when the signal level of the drive signal GD changes from the on-level to the off-level. That is, the electronic switch 31 stays in the on-state for a certain time period (delay time) Tdel after the signal level of the drive signal GD has changed from the on-level to the off-level.

In FIG. 3, only a delay time between the end of the on-pulse of the drive signal GD and the end of the on-time Ton are shown. Nevertheless, a delay may also occur at the beginning of the on-pulse. That is, there may be a delay time between the beginning of the on-pulse and the time when the electronic switch 31 switches on. However, this delay time at the beginning of the on-pulse is less critical in terms of regulating the output signal Sout. Thus, in the following the focus is on the delay time Tdel at the end of the on-pulse.

In FIG. 3, the end of the on-time Ton is the time when the inductor current $I_L$ stops to increase, which is when the electronic switch 31 (completely) switches off. The characteristic of the inductor current $I_L$ after switching off the electronic switch 31 (that is, during the off-time Toff) is dependent on the specific topology of the network 1. Two possible characteristics of the inductor current $I_L$ are shown in dotted lines in FIG. 3. In accordance with one of these characteristics, the inductor current $I_L$ rapidly decreases at the end of the time Ton. For example, this is the situation that occurs in a flyback converter, which is explained in detail with reference to FIG. 9 herein below. In a flyback converter, the inductor 21 is the primary winding of a transformer, wherein energy stored in the primary winding during the on-period Ton is transferred to a secondary winding during the off-period Toff so that a current flows through the secondary winding in the off-period Toff.

In accordance with another one of these characteristics shown in dotted lines in FIG. 3, the inductor current $I_L$ gradually decreases during the off-period Toff. For example, this is the situation that occurs in a boost converter, which is explained in detail with reference to FIG. 15 herein below.

The output signal Sout of the switched-mode power converter can be controlled by controlling the average input power of the switched-mode power supply in the individual drive cycles. The average input power $P_{AVG}$ in one drive cycle is given by:

$$P_{AVG} = \frac{Vin}{T} \cdot \int_{Tp} Iin \, dt, \quad (1)$$

where $P_{AVG}$ is the average input power in one drive cycle, Tp is the duration of the drive cycle, Vin is the input voltage, and Iin is the input current. Equation (1) is based on the assumption that the input voltage Vin changes slowly relative the duration Tp so that the input voltage Vin can be considered constant during one drive cycle.

In the embodiment shown in FIG. 3, a new drive cycle starts after the inductor current $I_L$ has decreased to zero. In this embodiment, the average input power $P_{AVG}$ in one drive cycle can be varied by either varying the on-time Ton, or by varying the off-time Toff.

According to one embodiment, the controller 10 controls the on-time Ton based on the feedback signal FB. In this embodiment, the controller 10 internally generates an off-threshold based on the feedback signal FB, compares the off-threshold with an on-time signal representing the time that has lapsed since the electronic switch 31 has been switched on, and switches off the electronic switch when the signal reaches the off-threshold. The on-time signal may be generated by a counter, or a sawtooth signal generator that is reset at the beginning of the on-time; or the on-time signal may be a signal representing the inductor current $I_L$. This is explained in greater detail herein further below.

Different criteria may be used to set the beginning of the on-period and the on-time Ton, respectively. According to one embodiment, the controller 10 operates the switched-mode power converter in a discontinuous current mode (DCM). In this case, the electronic switch 31 is periodically switched on, wherein the switching frequency is selected such that the inductor current $I_L$ during the off-time decreases to zero in each drive cycle. According to another embodiment, the controller 10 operates the switched-mode power converter in a quasi-resonant (QR) mode. In this operation mode, the beginning of a new drive cycle is selected based on a time instance at which the inductor current $I_L$ has decreased to zero, or the inductor 21 has been demagnetized, respectively.

According to one embodiment, the switched-mode power converter is configured to supply the output signal Sout from an input voltage Vin with a varying voltage level. The input voltage Vin may, for example, vary between 70V and 380V.

Figure 4:
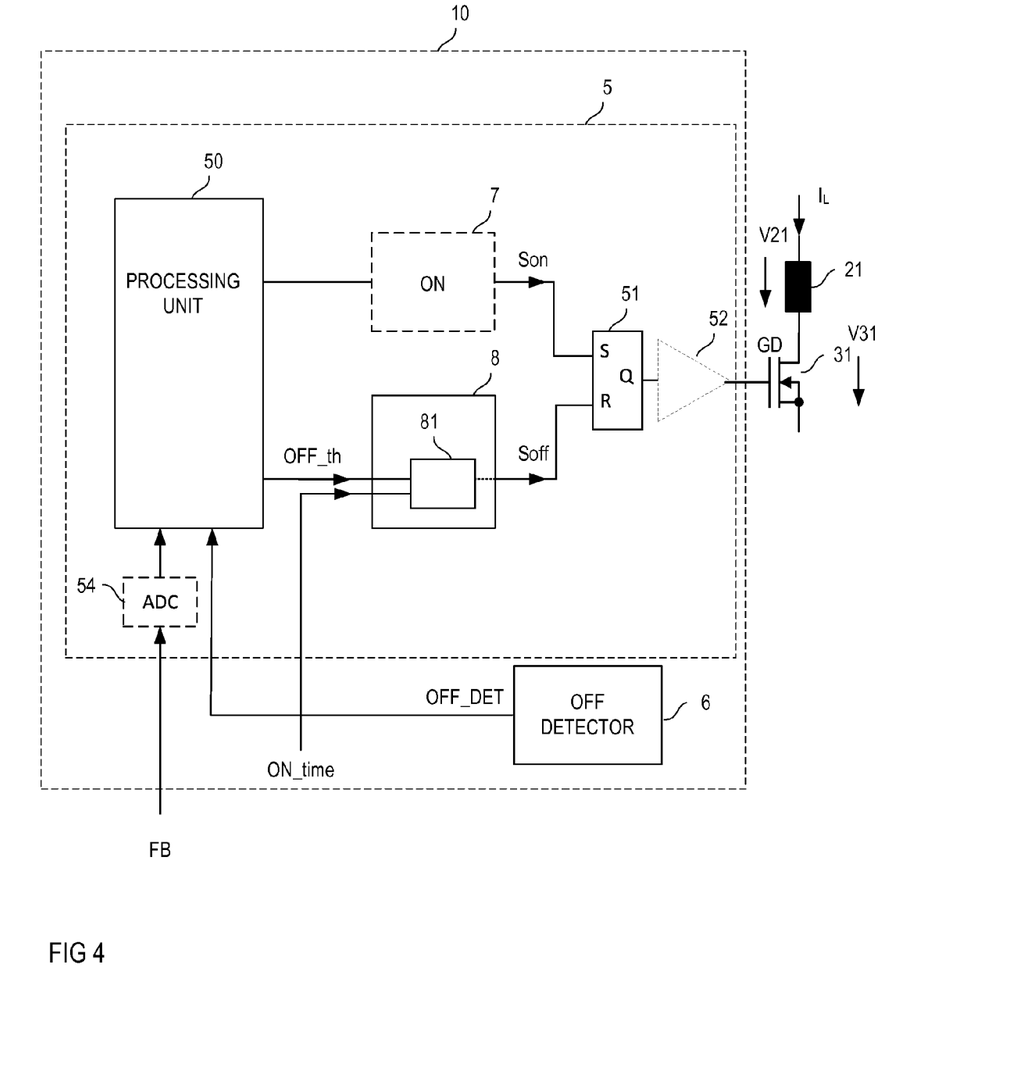
FIG. 4 schematically illustrates one embodiment of a controller of the switched mode power converter.

FIG. 4 schematically illustrates one embodiment of a controller 10 that generates the drive signal GD based on the feedback signal FB. The controller 10 includes an off-detector 6 that is configured to detect the time when the electronic switch 31 switches off. This detection may be based on the inductor current $I_L$ (which stops increasing at the time of switching off), a voltage V21 across the inductor 21 (which changes its polarity at the time of switching off), a voltage across the electronic switch, or any other operation parameter of the switched-mode power converter which is suitable to indicate the time at which the electronic switch 31 switches off. The off-detector is configured to generate a detector signal OFF_DET that indicates the time at which the electronic switch 31 switches off. The off-detector may be configured to generate the detector signal OFF_DET such that the detector signal OFF_DET has a predefined edge (e.g., a falling edge or a rising edge) at the time at which the electronic switch 31 switches off. A control unit 5 of the controller 10 receives the feedback signal FB and the detector signal OFF_DET and is configured to drive the electronic switch 31 based on these signals.

Referring to FIG. 4, the control unit 5 includes a processing unit 50. According to one embodiment, the processing unit 50 is a digital processing unit such as, for example, a microcontroller. The processing unit 50 receives the feedback signal FB. If the processing unit 50 is a digital processing unit an optional analog-to-digital converter (ADC) 54 may receive the feedback signal FB and provide a digital representation of the feedback signal FB to the processing unit 50. The control unit 5 further includes a flip-flop 51 that generates the drive signal GD based on an on-signal Son and an off-signal Soff. The output signal of the flip-flop 51 is a logic signal that assumes one of an on-level and an off-level. The on-level switches on the electronic switch 31, and the off-level switches off the electronic switch 31. Optionally, a driver 52 is connected between the output of the flip-flop 51 and the electronic switch. The driver 52 is configured to adapt a signal level of the flip-flop 51 output signal to a signal level that is suitable to drive the electronic switch 31. In the embodiment shown in FIG. 4, the flip-flop 51 is implemented as an SR flip-flop. However, this is only an example. Any other type of flip-flop or any other type of device that can assume two different states may be used as well.

The on-signal Son is either provided by the processing unit 50 or by an optional on-circuit 7 that can be controlled by the processing unit 50. The control unit 5 further includes an off-circuit 8 that generates the off-signal Soff, wherein the off-signal is configured to switch off the electronic switch 31 through the flip-flop 51. The processing unit 50 or the on-circuit 7 is configured to set the flip-flop 51 (in order to switch on the electronic switch 31) by generating a predefined signal level or a predefined edge of the on-signal Son. Equivalently, the off-circuit 8 is configured to reset the flip-flop 51 (in order to switch off the electronic switch 31) by generating a predefined signal level or a predefined edge of the off-signal Soff.

The off-circuit 8 receives an off-threshold OFF_th from the processing unit and an on-time signal ON_time. The on-time signal ON_time, in each on-time Ton, represents the time that has lapsed since the electronic switch 31 has been switched on. According to one embodiment, the controller 10 operates the switched-mode power converter in a voltage controlled mode. In this operation mode, the on-time signal ON_time is only dependent on the time that has lapsed since the electronic switch 31 has been switched on. In this embodiment, the on-time signal ON_time may be generated internally in the controller 10 using a counter, for example.

According to another embodiment, the controller 10 operates the switched-mode power converter in a current controlled mode. In this operation mode, the on-time signal is based on the current $I_L$ through the inductor 21. This current can be considered to increase substantially linearly over the on-time Ton.

The off-circuit 8 includes a comparator 81 that receives the on-time signal ON_time and the off-threshold OFF_th and causes an off-level of the off-signal Soff when the on-time signal ON_time reaches the off-threshold OFF_th.

Figure 5:
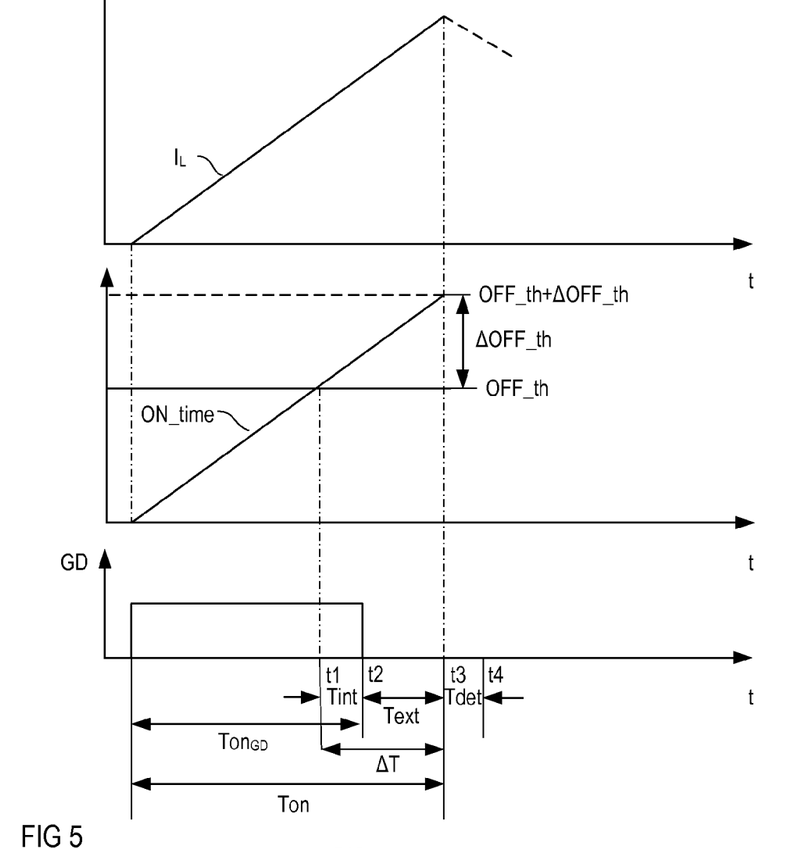
FIG. 5 shows timing diagrams that illustrate one way of operation of the controller.

One way of operation of the controller 10 shown in FIG. 4 is explained with reference to FIG. 5 below. FIG. 5 shows timing diagrams of the inductor current $I_L$, the on-time signal ON_time, the off-threshold OFF_th, and the drive signal GD in one drive cycle in order to explain different time delays that may occur in the controller 10 and in the electronic switch 31. In FIG. 5, t1 denotes the time at which the on-time signal ON_time reaches the off-threshold OFF_th during the on-time Ton. However, due to different time delays the electronic switch 31 does not switch off at the first time t1. A first time delay Tint, which will be referred to as internal time delay in the following, includes a comparator delay. The comparator delay represents a time delay in the comparator 82 between the time when the on-time signal ON_time reaches the off-threshold and the time when an output signal of the comparator 82 reflects that the on-time signal ON_time has reached the off-threshold. The off-circuit 8 generates the off-signal based on this comparator output signal. The comparator 81 may include additional circuit elements that may cause additional delay times that are included in the internal time delay Tint. After the internal delay time Tint, the drive signal GD at time t2 assumes the off-level.

In FIG. 5, Text denotes an external time delay caused by the optional driver 52 and the switch 31. In the present embodiment, Text corresponds to the delay time Tdel explained with reference to FIG. 3 herein before. The external delay time Text at least includes the so-called switching delay of the electronic switch 31. The "switching delay" is the delay between the time a drive signal applied to the control terminal (gate terminal) of the electronic switch 31 changes the signal level and the time the electronic switch changes the switching state based on the drive signal GD. For example, in a MOSFET as a shown in FIG. 4 the switching delay is caused by charging or discharging internal capacitances such as the gate-source capacitance and the output capacitance (usually referred to as $C_{OSS}$). In FIG. 5, t3 denotes the time at which the electronic switch 31 completely switches off. Due to delays in the off-detector circuit 6 there is a delay time Tdet between the time the electronic switch 31 switches off and the time the off-detector signal OFF_DET reflects the switching off of the electronic switch 31. Thus, at time t4 the detector signal OFF_DET "reports" this switching to the processing circuit 50. Text may change with the operating condition (operation point) of the electronic switch 31, wherein the operating condition of the electronic switch is dependent on operation parameters of the switched-mode power converter such as, for example, the voltage level of the input voltage Vin, the current level of the inductor current $I_L$, the temperature of the switched-mode power converter, or a signal level (voltage level) of the drive signal (drive voltage, gate voltage) GD.

In FIG. 5, ΔT denotes the delay time between the time t1 when the on-time signal ON_time reaches the off-threshold OFF_th and the time when the electronic switch 31 switches off. During this delay time, the inductor current $I_L$ further increases so that the switched-mode power converter continues to receive input power from the input 11, 12. In order to be able to control the input power as precisely as possible based on the feedback signal it is desirable to consider the time delay ΔT in the calculation of the off-threshold. That is, it is desirable to compensate the time delay ΔT.

Figure 6:
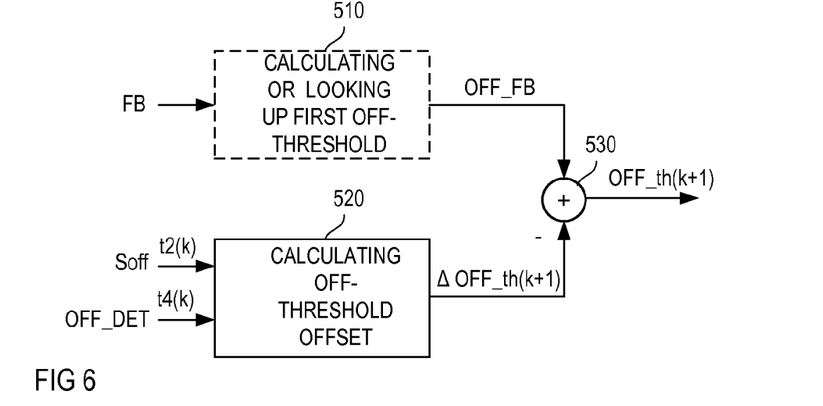
FIG. 6 illustrates one embodiment of calculating a delay compensated off-threshold in the controller.

FIG. 6 schematically illustrates one embodiment of how the processing unit 50 may compensate the time delay ΔT in generating the off-threshold OFF_th. Referring to FIG. 6, the processing unit 50 generates a first off-threshold OFF_FB based on the feedback signal FB. The feedback signal FB may change as the power consumption of the load Z (see FIG. 1) changes in order for the controller 10 to be able to adapt the input power of the switched-mode power converter such that the output signal Sout is substantially constant. According to one embodiment, the off-threshold OFF_FB corresponds to the feedback signal FB. According to another embodiment, the processing unit 50 calculates the first off-threshold OFF_FB based on the feedback signal FB in accordance with a predefined calculation method. According to yet another embodiment, the processing unit 50 includes a look-up table in which signal levels of the first off-threshold OFF_FB are assigned to signal levels of the feedback signal FB. Based on this look-up table and based on the signal level of the feedback signal FB the processing unit 50 may generate the signal level of the first off-threshold OFF_FB. Calculating or looking up the signal level of the off-threshold OFF_FB based on the feedback signal FB is represented by function block 510 in FIG. 6. This function block may be omitted when the feedback signal FB is directly used as the first off-threshold OFF_FB.

Referring to FIG. 6, the processing unit further calculates an compensation offset ΔOFF_th which considers the time delay ΔT between times t1 and t3 explained with reference to FIG. 5. Referring to FIG. 5, the time t1 when the on-time signal ON_time reaches the off-threshold OFF_th is associated with the off-threshold OFF_th while the time t3 when the electronic switch 31 finally switches off is associated with a higher off-threshold. The compensation offset ΔOFF_th represents the difference between the off-threshold OFF_th associated with time t1 and the higher off-threshold associated with time t3. Referring to FIG. 6, the delay time compensation includes subtracting the compensation offset ΔOFF_th from the feedback signal based first threshold OFF_FB in order to obtain the off-threshold OFF_th. In this way, the electronic switch 31 switches off at a time (which is time t3 in FIG. 5) which is associated with the first threshold OFF_FB which is based on the feedback signal FB. In this way, the on-time Ton of the electronic switch 31 is widely independent of the delay time ΔT.

Referring to FIG. 6, the processing unit calculates the compensation offset ΔOFF_th based on the off-signal Soff and off-detector signal OFF_DET. The off-signal Soff includes an information on the time t2 at which the drive signal GD assumes the off level. The off-detector signal OFF_DET represents the time t4 at which the processing unit 50 receives the information from the off-detector 6 that the electronic switch 31 has switched off. Calculating the compensation offset ΔOFF_th based on the off-signal Soff and the off-detector signal OFF_DET is explained in greater detail with reference to FIG. 7 below.

In order to illustrate the delay compensation functionality of the processing unit 50 FIG. 6 shows three functional blocks, namely a first functional block 510 that represents calculating or looking up the first off-threshold OFF_FB, a second functional block 520 that represents calculating the compensation offset ΔOFF_th, and a third functional block 530 that represents combining the compensation offset ΔOFF_th with the first off-threshold OFF_FB. According to one embodiment, this combining includes subtracting the compensation offset ΔOFF_th from the first off-threshold OFF_FB. It should be noted that these functional blocks illustrate the functionality rather than the implementation of the processing unit 50. For example, in a digital processing unit 50 that is based on a microprocessor the individual functional blocks illustrated in FIG. 6 can be implemented using hardware and software. That is, the hardware of the microprocessor may be used to implement the functionality illustrated in FIG. 6, so that not each of the functional blocks shown in FIG. 6 is implemented using dedicated circuitry.

In FIG. 6, k and k+1 represent drive cycles. t2($k$) and t4($k$) represent the second time and the fourth time in one drive cycle k, and ΔOFF_th(k+1) and OFF_th(k+1) represent the compensation offset and the off-threshold in a subsequent drive cycle k+1. That is, the off-threshold OFF_th in one drive cycle k+1 is based on time measurements t2(k) and t4(k) in a previous drive cycle k. According to one embodiment, the processing unit 5 in each drive cycle calculates the off-threshold OFF_th for the next drive cycle. According to another embodiment an compensation offset ΔOFF_th is calculated based on time measurements in one drive cycle and is kept constant for a plurality of subsequent drive cycles until a new compensation offset ΔOFF_th is calculated. According to one embodiment, the compensation offset ΔOFF_th calculated in one drive cycle is kept constant for a number of drive cycles that may be selected from a range ranging from 5 to 20 and, particularly, from a range ranging from 10 to 20.

The feedback signal FB may be calculated anew in each drive cycle. In this case, as the first threshold OFF_FB may vary over these drive cycles, the off-threshold OFF_th may change from drive cycle although the compensation offset ΔOFF_th is kept constant. According to another embodiment, the feedback signal FB is also kept constant for a number of subsequent drive cycles, such as 5 to 20, or 10 to 20 drive cycles. In this case, the same off-threshold OFF_th is used in a number of subsequent drive cycles.

Figure 7:
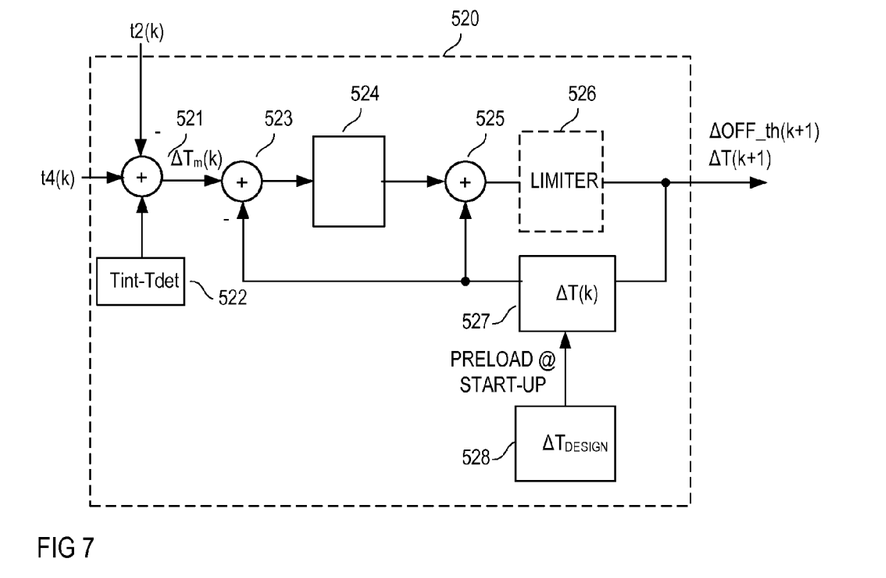
FIG. 7 illustrates one embodiment of the delay compensation in greater detail.

One embodiment of calculating the compensation offset ΔOFF_th is illustrated in FIG. 7. Referring to FIG. 7 calculating the compensation offset ΔOFF_th(k+1) for one drive cycle k+1 includes estimating the time delay ΔT(k+1) for this drive cycle k+1 based on the estimated time delay ΔT(k) that was used in a previous drive cycle k, and on a time delay ΔT$_m$(k) that was based on measurements in the previous drive cycle k. This time delay ΔT$_m$(k) will be referred to as measured time delay ΔT$_m$(k) in the following. Dependent on the specific implementation of the switched-power converter, the estimated time delay ΔT(k+1) can be used as the compensation offset ΔOFF_th(k+1), or the offset-threshold offset ΔOFF_th(k+1) is calculated based on this time delay ΔT(k+1).

In a voltage controlled switch-mode power converter in which the on-time signal ON_time only represents the time in the on-period Ton that has lapsed since the electronic switch 31 has been switched on the estimated time delay ΔT(k+1) can be used as the compensation offset ΔOFF_th (k+1). In a current controlled switch-mode power converter the compensation offset OFF_th(k+1) is calculated based on the estimated time delay ΔT(k+1) and further operation parameters such as, for example, the input voltage Vin. This is explained in further detail herein below.

Referring to FIG. 7, obtaining the measured time delay ΔT$_m$(k) in one drive cycle k includes calculating the time difference t4(k)−t2(k) between the fourth time t4(k) at which the off-detector 6 has detected that the electronic switch 31 has switched off, and the second time t2(k) at which the drive signal GD assumes the off-level. Obtaining the measured time delay ΔT$_m$(k) further includes taking into account the internal delay Tint and the detector delay Tdet. According to one embodiment, the detector delay Tdet is subtracted from the time difference t4(k)−t2(k) and the internal delay Tint is added to this time difference t4(k)−t2(k) in order to obtain the measured time delay ΔT$_m$(k). That is, according to one embodiment, $$\Delta T_m(k) = t4(k) - t2(k) + T\text{int} - T\text{det}. \quad (2)$$

In the illustration shown in FIG. 7, a calculation unit 521 such as an adder calculates the measured time difference ΔT$_m$(k) from the individual time parameters. The internal delay Tint and the detector delay Tdet are substantially dependent on the specific design of the controller 10, in particular the design of the off-circuit 8 and the detector circuit 6. These time delays Tint, Tdet are widely independent of operation parameters of the switched-mode power converter such as, for example, the temperature. These time delays can be calculated or measured once during the design or manufacturing process and can be stored in a memory 522 of the controller 10 and the processing unit 50, respectively.

Referring to FIG. 7, the processing unit 50 further includes another memory 527 such as, for example, a register in which the estimated delay time ΔT(k) from the previous drive cycle k is stored. A subtractor 523 subtracts the stored estimated time delay ΔT(k) from the measured time delay ΔT$_m$(k), a filter 524 receives the difference ΔT$_m$(k)−ΔT(k) and an adder 525 adds a filtered version of this time difference to the stored estimated time difference ΔT(k).

According to one embodiment, the filter 524 includes one of an FIR (Finite Impulse Response) filter, an IIR (infinite Impulse Response) filter, a median filter, or the like. The filter 524 may have an integral characteristic.

The estimated delay time ΔT(k+1) for the next drive cycle k+1 corresponds to the estimated time delay ΔT(k) in the previous drive cycle k plus the filtered time difference provided by the filter 524. Optionally, a limiter 526 limits the estimated time delay ΔT(k+1) such that the estimated time delay ΔT(k+1) cannot be smaller than a predefined lower threshold and not higher than a predefined upper threshold. This helps to prevent the estimated time delay ΔT(k+1) from assuming unreasonably high or unreasonably low levels that may occur in case of measurement errors or other errors in the loop that calculates the estimated time delay ΔT(k+1).

Referring to FIG. 7, the estimated time difference ΔT(k+1) is calculated based on the measured time difference ΔT$_m$(k) obtained in previous drive cycle k and the estimated time difference ΔT(k) that was used in the previous drive cycle k to provide for the delay compensation, where ΔT(k) may have been obtained based on measurements in a yet earlier drive cycle k−1. According to one embodiment, the memory 527 which holds the estimated time difference ΔT(k) of the previous drive cycle k is preloaded at start-up of the switched-mode power converter with a delay time ΔT$_{DESIGN}$ stored in another memory 528. This delay time ΔT$_{DESIGN}$ is calculated based on the design of the controller 10 and the electronic switch 31 or measured during the manufacturing process and is stored in the controller 10 at the end of the manufacturing process. Thus, at the time of start-up of the switched-mode power converter a relatively precise delay time for calculating the estimated delay time ΔT(k+1) is already available so that based on the time measurements only the difference between this delay time ΔT$_{DESIGN}$ and the actual delay time is regulated.

Figure 8:
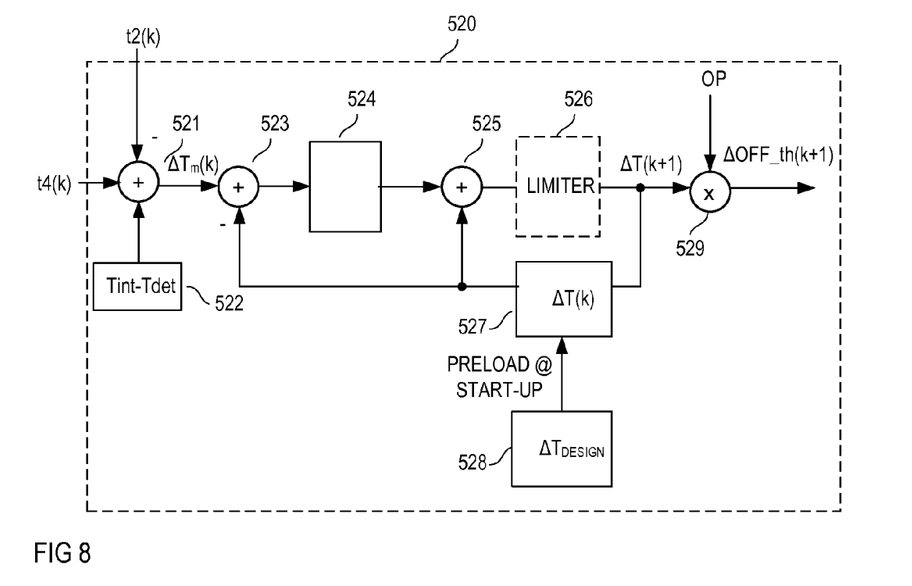
FIG. 8 illustrates a modification of the delay compensation illustrated in FIG. 7.

According to one embodiment shown in FIG. 8, calculating the compensation offset ΔOFF_th(k+1) includes multiplying the estimated time delay ΔT(k+1) with an external parameter OP that represents the slope of the inductor current I$_L$ during the on-time. According to one embodiment, the external parameter OP is a function of the input voltage Vin. The function may be a proportionality function. That is, the external parameter may be proportional to the input voltage Vin.

Figure 9:
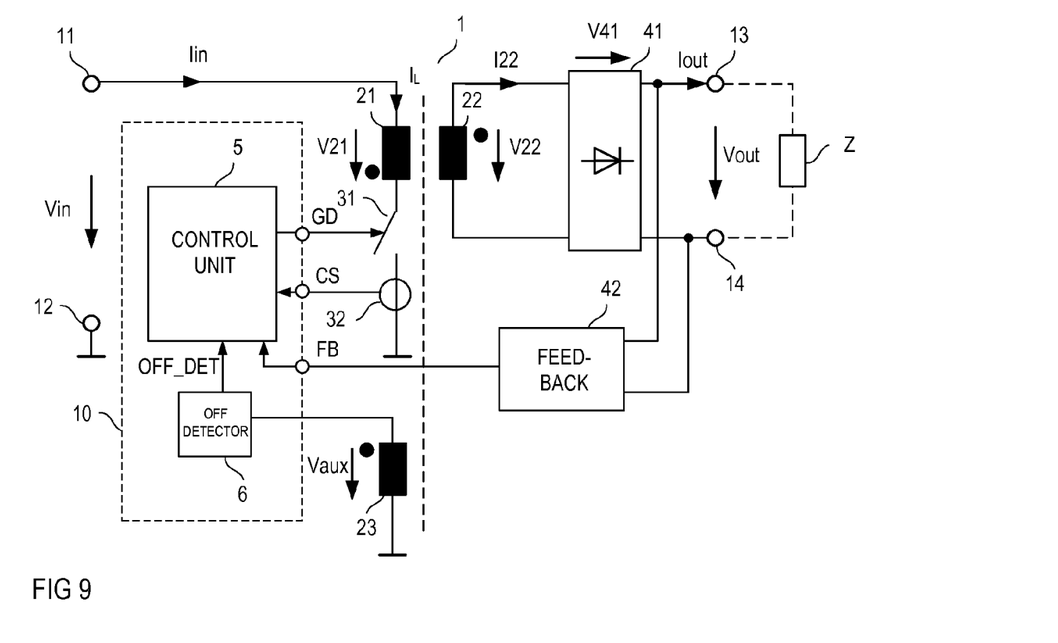
FIG. 9 shows one embodiment of a switched-mode power converter implemented with a flyback-converter topology.

FIG. 9 shows one embodiment of a switched-mode power converter that includes a network 1 with a flyback converter topology. In this embodiment, the inductor 21 is a primary winding of a transformer. The series circuit with the primary winding 21 and the electronic switch 31 is coupled to the input 11, 12 of the switched-mode power converter.

The transformer further includes a secondary winding 22 which is inductively coupled with the primary winding 21. A rectifier circuit 41 is connected between the secondary winding 22 and the output 13, 14. The primary winding 21 and the secondary winding 22 of the transformer have opposite winding senses. The transformer further includes an auxiliary winding 23 which is inductively coupled with the primary winding 21 and the secondary winding 22. The auxiliary winding 23 may have the same winding sense as the secondary winding 22. The off-detector 6 receives an auxiliary voltage Vaux across the auxiliary winding 23 and is configured to detect the time at which the electronic switch 31 switches off based on the auxiliary voltage Vaux. This is explained in greater detail herein further below.

According to one embodiment, the controller 10 is configured to drive the electronic switch 31 based on the inductor current $I_L$ which corresponds to the input current Iin in this embodiment. A current sensor 32 measures the input current Iin and supplies a current sensing signal CS which represents the input current Iin to the controller 10. The current sensor 32 may be a conventional current sensor 32 configured to measure a current through an electronic switch. Embodiments of the current sensor 32 include, but are not restricted to, a shunt resistor (not shown in FIG. 1) connected in series with the electronic switch 31, a current sensor based on a Hall effect, an inductive current sensor. According to yet another embodiment, the electronic switch 31 is a MOSFET and the current sensor includes another MOSFET (often referred to as Sense FET) coupled to the electronic switch MOSFET and operated substantially in the same operation point as the electronic switch 31. In this current sensor, a current through the Sense FET is measured which is indicative of the load current through the electronic switch 31. In case of a shunt resistor, a voltage across the shunt resistor may be used as the current sensing signal CS.

Figure 10:
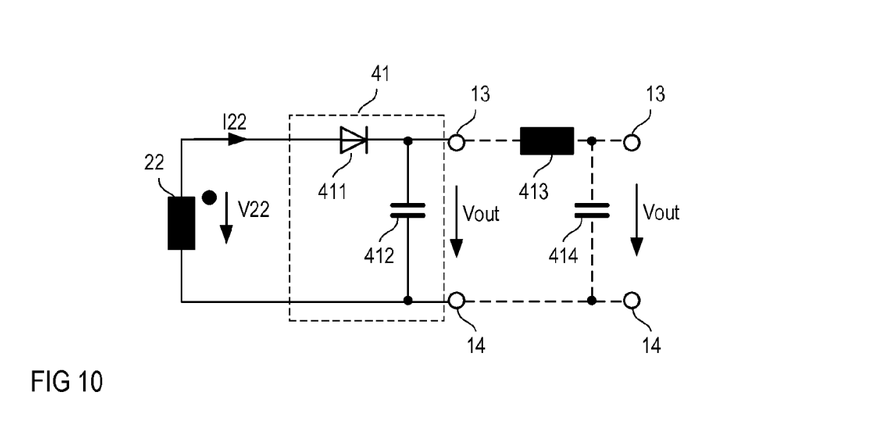
FIG. 10 shows one embodiment of a rectifier circuit in the switched-mode power converter shown in FIG. 9.

The rectifier circuit 41 can be implemented with a conventional rectifier circuit topology. One embodiment of such rectifier circuit 41 is illustrated in FIG. 10. The rectifier circuit 41 according to this embodiment includes a series circuit with a rectifier element 411 and a capacitor 412, wherein the series circuit is connected in parallel with the secondary winding 22 of the transformer, and wherein the output voltage Vout is available across the capacitor 412. The rectifier element 411 is drawn as a diode in FIG. 10. However, another type of rectifier element such as a MOSFET operated as a synchronous rectifier (SR) may be used instead.

According to another embodiment, the rectifier circuit 41 has a topology which is more complex than the topology explained before. According to one embodiment, which is illustrated in dashed lines in FIG. 10, a series circuit with an inductor 413 and a further capacitor 414 is connected in parallel with the capacitor 412 explained hereinbefore. In this case, the output voltage Vout is available across the further capacitor 414.

Figure 11:
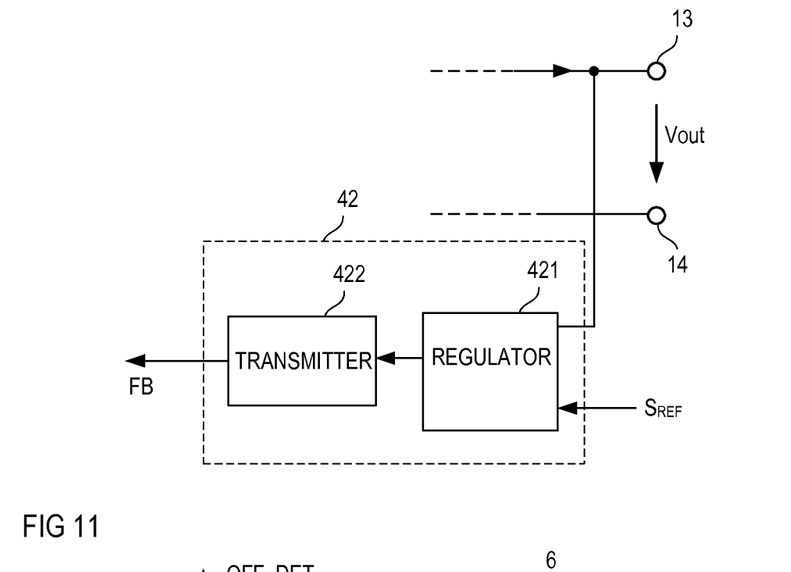
FIG. 11 shows one embodiment of feedback circuit in the switched-mode power converter shown in FIG. 9.

FIG. 11 shows one embodiment of the feedback circuit 42. Referring to FIG. 11, the feedback circuit 42 includes a regulator 421 that receives the output signal and that either receives the reference signal $S_{REF}$ (as shown) or internally generates the reference voltage $S_{REF}$. The regulator 421 compares the output signal Sout with the reference signal $S_{REF}$ and generates the feedback signal FB based on this comparison. The regulator 421 may have one of a proportional (P) characteristic, a proportional-integral (PI) characteristic, or the like. According to one embodiment, the regulator 421 is implemented on the secondary side of the switched-mode power converter and the feedback circuit 42 includes a transmitter 422 that is configured to transmit the feedback signal FB from the secondary side of the switched-mode power converter to the primary side across the potential barrier (isolation barrier) provided by the transformer. The controller 10 is implemented on the primary side in this embodiment. The transmitter circuit 422 may include an optocoupler, or any other type of circuitry that is suitable to transmit a signal across a potential barrier. According to another embodiment, the transmitter 422 includes another transformer.

One way of operation of the switched-mode power converter shown in FIG. 9 is explained with reference to FIG. 12 that shows timing diagrams of the input current Iin, the auxiliary voltage Vaux and the drive signal GD in one drive cycle.

Figure 12:
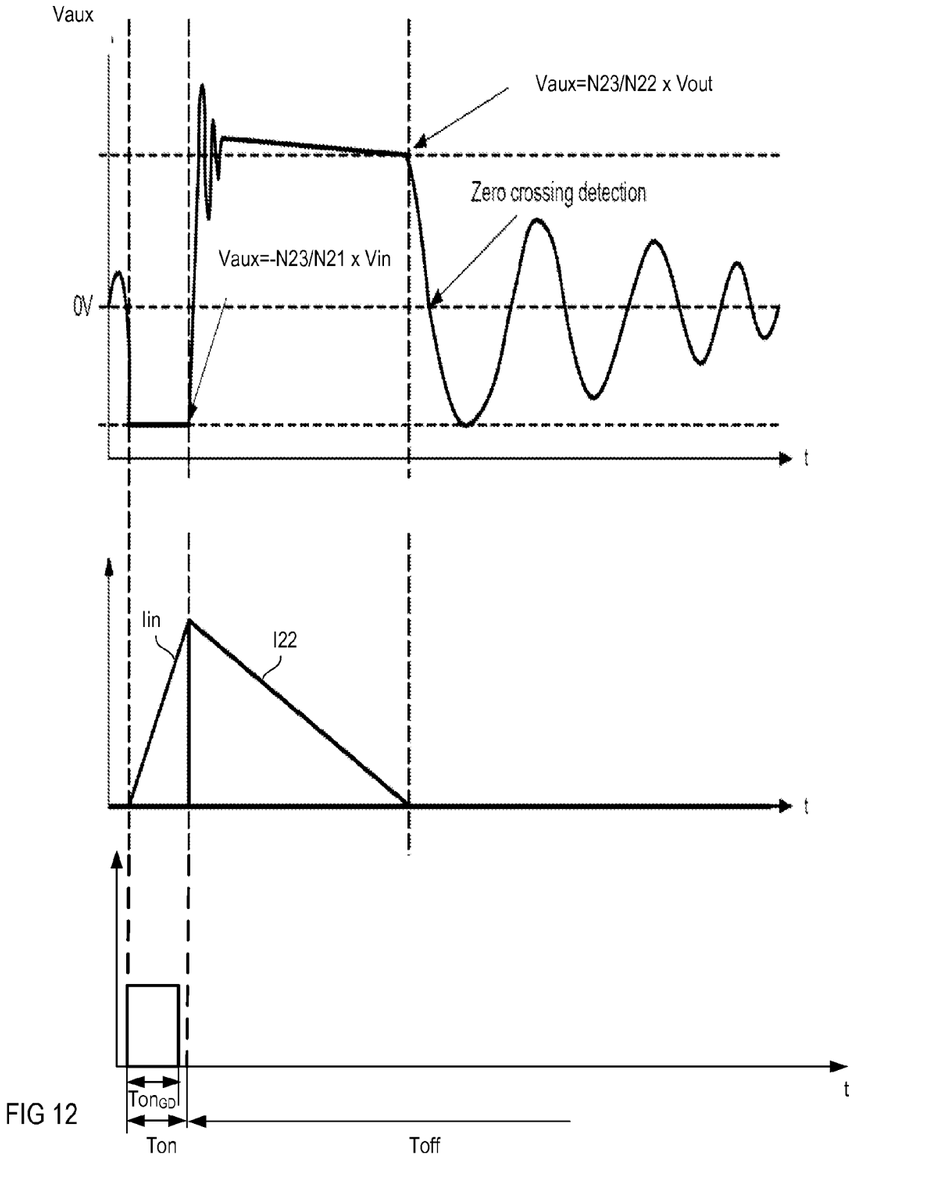
FIG. 12 shows timing diagrams that illustrate one way of operation of the switched-mode power converter shown in FIG. 9.

Referring to FIG. 12, the input current Iin increases during the on-time Ton and decreases during the off-time Toff. During the on-time Ton, the electronic switch 31, referring to FIG. 9, connects the primary winding 21 of the transformer to the input 11, 12 where the input voltage Vin is available. The slope of the increase of the input current Iin during the on-time Ton is substantially proportional to the voltage level of the input voltage Vin and substantially inversely proportional to the inductance L of the primary winding 21 and the transformer, respectively. That is:

$$dIin/dt = Vin/L. \qquad (2)$$

During the on-time Ton, a voltage V21 across the primary winding substantially corresponds to the input voltage Vin and a voltage V22 across the secondary winding 22 substantially corresponds to $-N22/N21 \cdot Vin$, where N21 represents the number of windings of the primary winding 21 and N22 represents the number of windings of the secondary winding 22. As the voltage V22 across the secondary winding 22 is negative during the on-period (which is by virtue of the primary winding 21 and the secondary winding 22 having opposite winding senses) a current I22 through the secondary winding 22 is zero during the on-period.

At the beginning of the off-time Toff, the voltage V21 across the primary winding 21 and, consequently, the voltage V22 across the secondary winding 22 reverses the polarity and increases until the voltage V22 across the secondary winding 22 substantially corresponds to the output voltage Vout plus a voltage V41 across the rectifier circuit 41. In the rectifier circuit 41 shown in FIG. 10, the voltage V41 substantially corresponds to the forward voltage of the rectifier element 411. During the off-time, the primary winding 21 is being demagnetized and transfers the energy that was inductively stored in the primary winding 21 during the on-time to the secondary winding 22 and the output 13, 14, respectively.

Referring to FIG. 12, the input current Iin decreases to zero at the end of the on-time (that is, when the electronic switch 31 switches off). A current I22 through the secondary winding 22 which is zero during the on-time Ton jumps to a start level at the beginning of the off-time Toff and then decreases.

By virtue of the inductive coupling between the auxiliary winding 23 and the primary winding 21, the voltage level of the auxiliary voltage Vaux during the on-time Ton substantially corresponds to $$Vaux = N23/N21 \cdot Vin, \qquad (3a)$$

where N23 represents the number of windings of the auxiliary winding 23. during the off-time, the voltage level of the auxiliary voltage Vaux substantially corresponds to $$Vaux = N23/N22 \cdot (Vout + V41) \qquad (3b)$$

as long as the current I22 through the secondary winding 22 has not decreased to zero. As the secondary side current I22 decreases to zero, that is, as the transformer is completely demagnetized, the secondary side voltage V22 and, consequently, the auxiliary voltage Vaux becomes zero. Parasitic effects such as, for example, parasitic capacitances of the transformer may cause oscillations of the auxiliary voltage Vaux, in particular at the beginning of the off-time Toff and after the transformer has been demagnetized. Those oscillations are schematically illustrated in FIG. 12.

Referring to FIG. 12, the auxiliary voltage Vaux, like the primary voltage V21 and the secondary voltage V22, changes the polarity at the end of the on-time Ton and the beginning of the off-time, respectively. According to one embodiment, the off-detector 6 is configured to detect the time when the auxiliary voltage Vaux changes the polarity, that is when the auxiliary voltage crosses zero (0V), and generates the off-detector signal OFF_DET based on this detection. Thus, the auxiliary voltage Vaux and, more particularly, the zero crossing of the auxiliary winding 23 is used to detect the time when the electronic switch 31 switches off. This time corresponds to time t3 shown in FIG. 5. The delay time Tdet shown in FIG. 5 corresponds to the time difference between the zero crossing of the auxiliary voltage Vaux and the time when the off-detector signal OFF_DET indicates this zero crossing.

Figure 13:
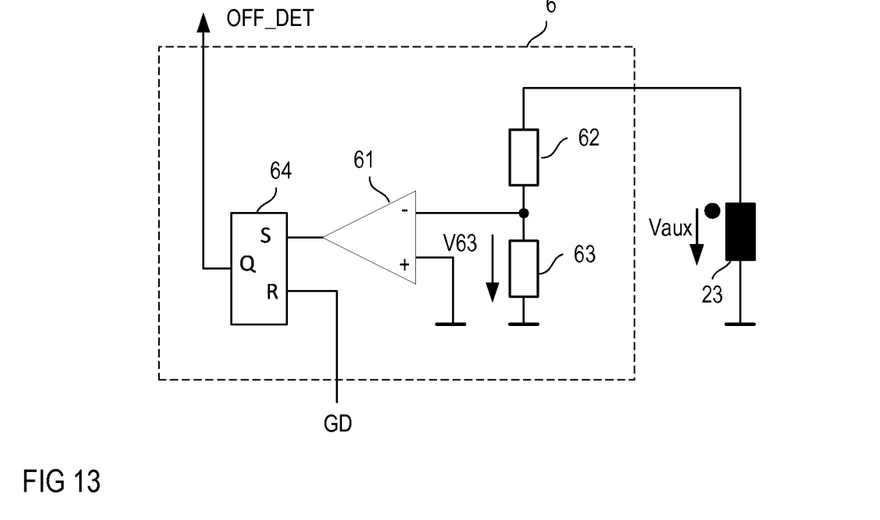
FIG. 13 shows one embodiment of an off-detector in the controller.

FIG. 13 shows one embodiment of the off-detector 6. The off-detector includes a comparator 61 which receives the auxiliary voltage Vaux or a voltage proportional to the auxiliary voltage Vaux. According to one embodiment, a voltage divider 62, 63 receives the auxiliary voltage Vaux and provides a voltage V63 proportional to the auxiliary voltage Vaux to the comparator 61. The comparator 61 compares the auxiliary voltage Vaux or the voltage V63 with a reference potential that represents zero. The reference potential is the electrical potential of the circuit node to which the auxiliary voltage is referenced to. According to one embodiment, the output signal of the comparator 61 is the detector signal OFF_DET, wherein the output signal of the comparator 61 changes the signal level each time the auxiliary voltage Vaux decreases to zero. The edge of the comparator signal may be used to indicate the time at which the auxiliary voltage Vaux reaches zero.

Referring to FIG. 12, the auxiliary voltage Vaux may cross zero several times in one drive cycle. In order for the detector signal OFF_DET to indicate only the zero crossing at the end of the on-time, the off-detector optionally includes a flip-flop 64 such as an SR flip-flop (shown in dashed lines in FIG. 13). This flip-flop may be reset at the beginning of the on-time using, e.g., the drive signal GD and set by the comparator signal. In this embodiment, the detector signal OFF_DET is the output signal of the flip-flop. In this embodiment, the detector signal OFF_DET changes from a first level to a second level, such as from a high level to a low level, at the beginning of the on-time Ton triggered by the drive signal GD and changes from the second signal level to the first level once at the end of the on-time triggered by the comparator signal. The change from the second level to the first level indicates the time (t3 in FIG. 5) at which the electronic switch 31 switches off.

The auxiliary winding 23 may not only be used to detect the switching off of the electronic switch 31. According to one embodiment, the auxiliary voltage is also used to generate a supply voltage for the controller. According to yet another embodiment, the auxiliary winding is used to measure the input voltage Vin. As stated above, the auxiliary voltage Vaux is proportional to the input voltage Vin during the on-time Ton. According to one embodiment, the controller 10 is configured to obtain a signal level of the input voltage Vin based on measuring the auxiliary voltage Vaux during the on-time Ton and taking into account the winding ratio N23/N21.

According to one embodiment, the controller 10 operates the switched-mode power converter in current controlled mode. In this embodiment, the controller 10 receives the current sense signal CS as the on-time signal ON_time signal explained with reference to FIG. 5 herein before. As the input current Iin and therefore, the current sense signal CS increases over the on-time Ton the current sense signal CS can be used to control the on-time Ton based on a comparison with the off-threshold OFF_th. A delay that may occur in the current sensor 32 can be considered independent of operation parameters and may form a part of the internal delay Tint explained before.

As the slope of the input current Iin and the current sense signal CS, respectively, is dependent on the input voltage Vin the delay compensation, according to one embodiment, takes into account the input voltage Vin as the operation parameter OP explained with reference to FIG. 8. That is, the estimated delay time $\Delta T(k+1)$ is multiplied with a value representing the input voltage Vin in order to obtain the compensation offset $\Delta OFF\_th(k+1)$.

Figure 14:
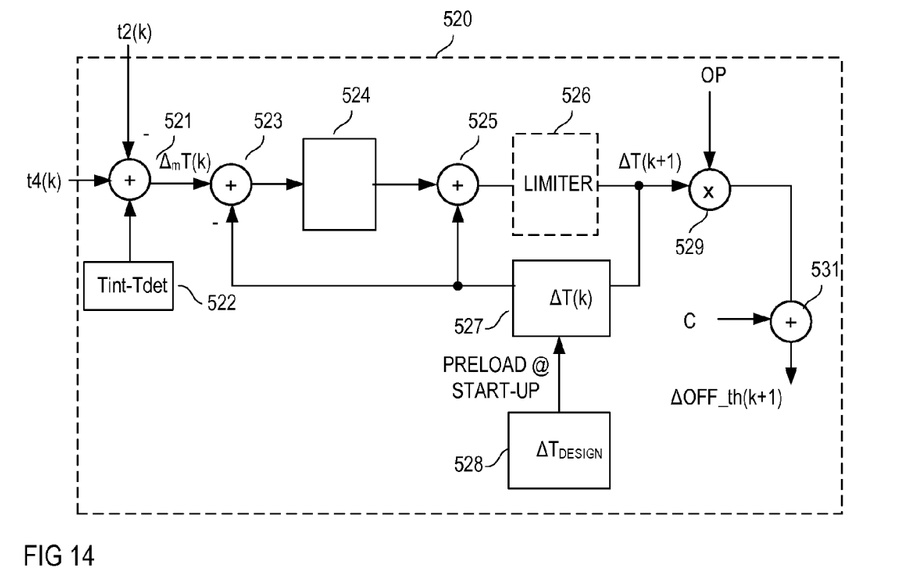
FIG. 14 illustrates another modification of the delay compensation illustrated in FIG. 7.

FIG. 14 illustrates another embodiment of calculating the compensation offset $\Delta OFF\_th(k+1)$. The embodiment shown in FIG. 14 is based on the embodiment shown in FIG. 8 and additionally includes adding a constant value C to the result of multiplying the estimated delay time $\Delta T(k+1)$ with the operation parameter OP in order to obtain the compensation offset $\Delta OFF\_th(k+1)$. This constant C takes into account that the delay of the comparator 81 which compares with the on-time signal ON_time with the off-threshold may be dependent on the slope of the on-time signal ON_time. In the current controlled mode, that is when the current sense signal CS is used as the on-time signal ON_time, the slope may vary dependent on the input voltage Vin. In particular, the comparator delay may decrease as the slope of the on-time signal ON_time increases. Thus, at higher levels of the input voltage Vin the comparator delay is shorter than considered in the internal delay Tint stored in the controller 10. On the other hand, at a given delay time $\Delta T(k+1)$, the compensation offset $\Delta OFF\_th(k+1)$ increases as the input voltage Vin increases. In order to compensate for these opposing effects, the constant C may be considered in the compensation offset $\Delta OFF\_th(k+1)$.

Figure 15:
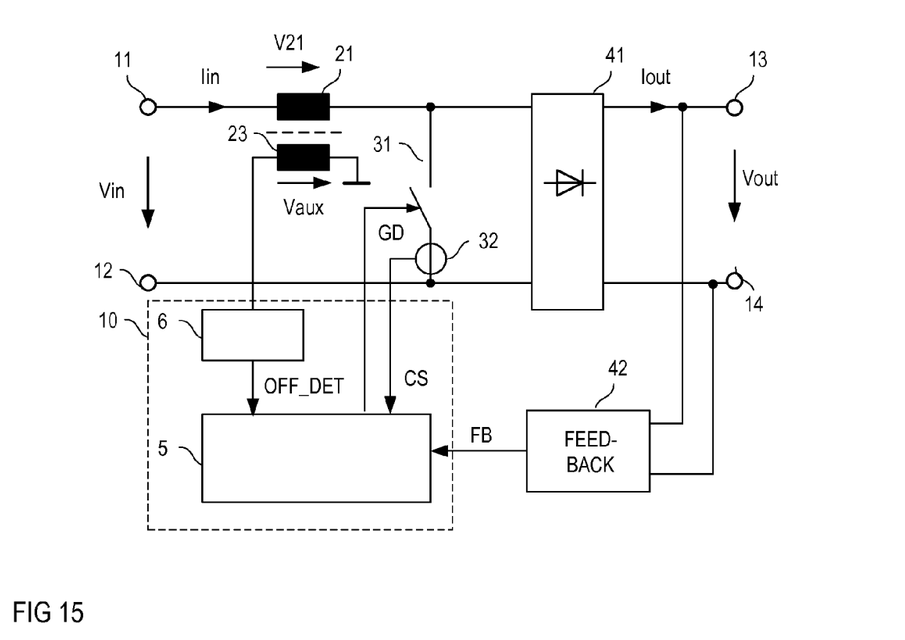
FIG. 15 shows one embodiment of a switched-mode power converter implemented with a boost-converter topology.

It should be noted that the principles explained herein before are not restricted to be used in context with a flyback converter, but may be used in other types of converters as well. FIG. 15 shows one embodiment of a boost converter that includes an inductor 21 such as a choke connected in series with an electronic switch 31, wherein the series circuit is connected to the input 11, 12. An auxiliary winding 23 is inductively coupled with the inductor 21, and a measurement circuit 6 receives an auxiliary voltage Vaux. The auxiliary winding 23 and the inductor 21 have the same winding senses so that the auxiliary voltage represents the voltage across the inductor 21. When the electronic switch 31 is switched on, the inductor 21 is connected in series with electronic switch 31 between the input nodes 11, 12 and is magnetized. As the electronic switch 31 switches off a voltage V21 across the inductor changes the polarity and the inductor 21 drives a current through the rectifier 41 to the output 13, 14. Like in the embodiment explained with reference to FIG. 9, a zero crossing of the auxiliary voltage Vaux occurs when the electronic switch 31 switches off so that the auxiliary voltage Vaux can be used to detect the time of switching off the electronic switch.

The controller 10 may be configured to operate the boost converter in a current controlled mode. In this case, the controller 10 receives the current sense signal CS as the on-time signal ON_time and, in the delay compensation, the input voltage Vin may be considered as the operation parameter OP.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and bluray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method comprising: driving an electronic switch in a switched-mode power converter in successive drive cycles, wherein driving the electronic switch in each of the drive cycles comprises switching on the electronic switch for an on-period and subsequently switching off the electronic switch for an off-period; establishing the on-period based on a comparison of an on-time signal with an off-threshold; calculating the off-threshold based on an output signal of the switched-mode power converter and a compensation offset; and calculating the compensation offset in one drive cycle based on an estimated delay time, wherein the estimated delay time is calculated based on a measured delay time and an estimated delay time of a previous drive cycle.

2. The method of claim 1, wherein calculating the off-threshold comprises multiplying the estimated delay time with a function of an operation parameter of the switched-mode power converter.

3. The method of claim 2, wherein calculating the off-threshold further comprises: adding a constant to a result of multiplying the estimated delay time with the function of the operation parameter of the switched-mode power converter.

4. The method of claim 2, wherein the operation parameter is an input voltage of the switched-mode power converter.

5. The method of claim 1, wherein the on-time signal is based on a current through an inductor connected in series with the electronic switch.

6. The method of claim 1,
wherein the comparison of the on-time signal with the off-threshold comprises comparing the on-time signal with the off-threshold in a comparator, and
wherein obtaining the measured delay time comprises measuring a time difference between a time at which the comparator indicates that the on-time signal has reached the off-threshold and a time at which an off-detector indicates that the electronic switch has switched off.

7. The method of claim 6, wherein detecting that the electronic switch has switched off comprises: evaluating a voltage across an auxiliary winding which is inductively coupled with an inductor connected in series with the electronic switch.

8. The method of claim 7, wherein obtaining the measured delay time further comprises correcting the measured time difference using at least one stored fixed delay time.

9. The method of claim 1, further comprising:
in a first drive cycle after start-up of the switched-mode power converter, replacing the delay time of the previous drive cycle with a fixed delay time stored in the switched-mode power converter.

10. The method of claim 1, wherein calculating the estimated delay time comprises: calculating a difference between the estimated delay time in the previous drive cycle and the measured time delay; filtering the difference to obtain a filtered difference; and adding the filtered difference to the estimated delay time in the previous drive cycle.

11. The method of claim 10, wherein filtering the difference to obtain a filtered difference further comprises using a filter selected from the group consisting of:
an FIR filter,
and IIR filter, and
a median filter.

12. The method of claim 1, wherein calculating the estimated delay time further comprises:
limiting the estimated delay time to be in a predefined range.

13. A drive circuit for a switched-mode power converter, wherein the drive circuit is configured to drive an electronic switch in the switched-mode power converter in successive drive cycles, wherein driving the electronic switch in each of the drive cycles comprises switching on the electronic switch for an on-period and subsequently switching off the electronic switch for an off-period; to establish the on-period based on a comparison of an on-time signal with an off-threshold; to calculate the off-threshold based on an output signal of the switched-mode power converter and a compensation offset; and to calculate the compensation offset in one drive cycle based on an estimated delay time, wherein the estimated delay time is calculated based on a measured delay time and an estimated delay time of a previous drive cycle.

14. The drive circuit of claim 13, wherein the drive circuit is configured to calculate the off-threshold based on multiplying the estimated delay time with a function of an operation parameter of the switched-mode power converter.

15. The drive circuit of claim 14, wherein the drive circuit is further configured to calculate the off-threshold based on adding a constant to a result of multiplying the estimated delay time with the function of the operation parameter.

16. The drive circuit of claim 14, wherein the operation parameter is an input voltage of the switched-mode power converter.

17. The drive circuit of claim 14, wherein the on-time signal is based on a current through an inductor connected in series with the electronic switch.

18. The drive circuit of claim 13, comprising
a comparator configured to compare the on-time signal with the off-threshold; and
an off-detector, wherein the drive circuit is further configured to obtain the measured delay time based on measuring a time difference between a time at which the comparator indicates that the on-time signal has reached the off-threshold and a time at which an off-detector indicates that the electronic switch has switched off.

19. The drive circuit of claim 18, wherein the off-detector is configured to detect that the electronic switch has switched off based on evaluating a voltage across an auxiliary winding which is inductively coupled with an inductor connected in series with the electronic switch.

20. The drive circuit of claim 19, further configured
to obtain the measured delay time based on correcting the measured time difference using at least one stored fixed delay time.

21. The drive circuit of claim 13, further configured
in a first drive cycle after start-up of the switched-mode power converter, to replace the delay time of the previous drive cycle with a fixed delay time stored in the drive circuit.

22. The drive circuit of claim 13, further configured to calculate the estimated delay time based on calculating a difference between the estimated delay time in the previous drive cycle and the measured time delay; filtering the difference to obtain a filtered difference; and adding the filtered difference to the estimated delay time in the previous drive cycle.

23. The drive circuit of claim 22, further comprising a filter selected from the group consisting of:
an FIR filter,
and IIR filter, and
a median filter
to obtain the filtered difference.

24. A switched-mode power converter, comprising: an inductor; an electronic switch connected in series with the inductor; and a drive circuit, wherein the drive circuit is configured to drive the electronic switch in successive drive cycles, wherein driving the electronic switch in each of the drive cycles comprises switching on the electronic switch for an on-period and subsequently switching off the electronic switch for an off-period; to establish the on-period based on a comparison of an on-time signal with an off-threshold; to calculate the off-threshold based on an output signal of the switched-mode power converter and a compensation offset; and to calculate the compensation offset in one drive cycle based on an estimated delay time, wherein the estimated delay time is calculated based on a measured delay time and an estimated delay time of a previous drive cycle.

25. The switched-mode power converter of claim 24, wherein the switched-mode power converter has a flyback converter topology.

26. The switched-mode power converter of claim 24, wherein the switched-mode power converter has a boost converter topology.

\* \* \* \* \*